United States Patent Office 3,511,830
Patented May 12, 1970

3,511,830
STARCH PRODUCT
Edwin L. Speakman, Clinton, Iowa, assignor to Standard Brands Incorporated, New York, N.Y., a corporation of Delaware
No Drawing. Continuation-in-part of application Ser. No. 367,246, May 13, 1964. This application Aug. 27, 1968, Ser. No. 755,733
Int. Cl. C13l 1/08
U.S. Cl. 260—233.5                        18 Claims

ABSTRACT OF THE DISCLOSURE

This invention relates to diazonium salts of esters of starch and anthranilic acid and diazonium salts of esters of starch and derivatives of anthranilic acid. These diazonium salts of esters of starch may be reacted to obtain cross-linked starch products. They may also be coupled with coupling compounds to produce colored starch derivatives.

THE INVENTION

This application is a continuation in part of application Ser. No. 367,246, filed May 13, 1964, now abandoned.

This invention relates to diazonium salts of esters of starch and anthranilic acid and to diazonium salts of esters of starch and derivatives of anthranilic acid.

Diazonium salts of esters of starch and anthranilic acid and diazonium salts of esters of starch and derivatives of anthranilic acid have peculiar and surprising properties. For example, the diazonium salts of esters of starch may be cross-linked. This provides the benefit that when the diazonium salts of esters of starch are used in clay coatings of paper, greatly improved wet rub resistance is achieved. Also the diazonium salts of esters of starch show light sensitivity, and can be reacted with coupling compounds to obtain various differently colored starch derivatives.

The term "diazonium salts of esters of starch" as used herein includes both the diazonium salts of esters of starch and anthranilic acid and the diazonium salts of esters of starch and derivatives of anthranilic acid, and the term "anhydrides" as used herein includes both isatoic anhydride and derivatives of isatoic anhydride. The term "starch ester" as used herein includes both esters of starch and anthranilic acid and esters of starch and derivatives of anthranilic acid.

Illustrative examples of anhydrides which may be used to prepare the starch esters which in turn may be used to prepare the diazonium salts of esters of starch of the present invention are shown below by the formula:

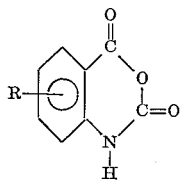

where R is a radical selected from the group consisting of:

(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing two to six carbon atoms and one or more atoms of oxygen, nitrogen and sulfur.

Specific examples of R radicals which may be present are hydrogen, 4-methyl, 4-phenyl, 4-(p-methylphenyl), 4-(2-phenylethyl), 4-methoxy, 4-methylamino, 4-acetyl, 4-aldehydo, 4-acetamido, 4-acetoxy, 4-carboxymethyl, 4-carboxy, 4-carbomethoxy, 4-carboxyvinyl, 4-cyano, 4-carbamyl, 4-cyclohexyl, 4-epoxyethyl, 4-chloro, 4-hydroxy, 4-nitro, 4-sulfo, 4-ureido, as well as various substituted derivatives such as 4-chloromethyl, 4-(p-hydroxyphenyl), 4-chloromethoxy, 4-chloroacetamido, 4-chloroacetoxy 4-(N-methylureido), iminoethyl and aziridinylethyl.

While the present invention is not limited to any theory, it is believed that the reaction between the anhydrides and starch proceeds as follows:

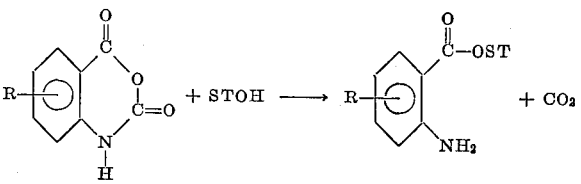

where STOH is starch, ST is an anhydroglucose unit and R is identified above.

The reaction of the anhydrides with starch may be accomplished in a number of ways; for instance, in an aqueous slurry of starch or in a suspension of starch in an organic solvent, such as dimethyl formamide, dimethyl sulfoxide and the like. Also, the reaction may be accomplished in a semi-dry state. For example, heating starch-water filter-cakes containing the anhydrides or by heating starch-water mixtures containing the anhydrides during drum drying. Typically, however, the reaction between the anhydrides and the starch is carried out in an aqueous slurry of starch, since organic solvents are relatively expensive, generally flammable and often require special equipment and extreme care in handling. Also, it is preferred that the reaction be carried out in an aqueous suspension of starch under conditions whereby substantially the original granular structure of the starch is maintained throughout the reaction. When the granular structure of the starch is not substantially altered during the reaction and is therefore retained in the final product, the starch esters may be recovered from the aqueous slurry and purified by filtration and washing, employing techniques and apparatus normal to the starch wet milling industry.

The term "starch" as used herein includes all raw starches such as corn, tapioca, potato, wheat, sago, arrowroot, rice, and the like, and various modified starches and derivatives of starch, such as oxidized starches, starch esters, starch ethers, and the like, the only requirement being that the starch contain free hydroxyl groups.

To react starch with the anhydrides in an aqueous medium under conditions whereby a starch ester is produced in granular form, the reaction temperature employed should be below that which causes gelatinization of the starch, for instance temperatures up to about 145° F. Higher temperatures may be employed when starch gelatinization inhibitors are present, such as NaCl, $Na_2SO_4$ and the like.

In order to react starch with anhydrides under aqueous slurry conditions, it is necessary that the pH of the slurry be above about 6, and typically be in a range of from about 7.5 to about 9. The other major variables involved in reacting anhydrides with starch are the concentration of the anhydrides, reaction temperature, reaction time and the starch concentration. These variables are interdependent and the choice of a value for one variable will depend on the other variables, and of course, on the particular properties desired in the starch ester.

In order to prepare the diazonium salts of esters of starch of the present invention, it is necessary that the diazotizing reaction be carried out under acidic conditions. Preferably the reaction is carried out in an aqueous slurry under conditions whereby the granular structure of the starch ester is maintained. To perform the diazotizing reaction nitrous acid must be provided in the reaction medium. The nitrous acid may be provided in the reaction medium, for example, by using nitrous acid, a salt of nitrous acid which upon acidification will yield nitrous acid or an organic nitrite which will hydrolyze to yield nitrous acid.

The diazotizing reaction is believed to proceed as follows:

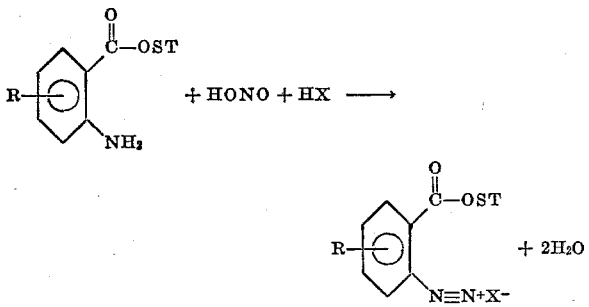

where ST is an anhydroglucose unit, R is identified above and X is a salt-forming ion.

Suitable acids which may be used to provide acidic conditions in the reaction medium are the strong mineral acids, for instance, hydrochloric, sulfuric, nitric, phosphoric, and the like, and organic acids such as acetic acid.

The pH at which the diazotizing reaction is carried out may be varied over a realtively wide range of acidity, but it is preferred to carry out the reaction at a pH below about 5.5 and most preferably in a pH range of from about 3 to about 5.

The temperature at which this reaction is performed is not critical. The reaction is essentially spontaneous. Relatively high temperatures of up to about 160° to about 170° F. may be employed. Of course, the temperature should not be high enough to decompose the diazonium salt and/or the starch ester.

Theoretically, starch esters having a degree of substitution up to about 3 ester groups per anhydroglucose unit may be obtained by reacting starch with the anhydrides. The ester content of the starch ester or the degree of substitution thereof greatly affects the properties of the diazonium salts of esters of starch prepared therefrom. When diazonium salts of esters of starch are prepared from starch esters having a degree of substitution up to about 0.1, the diazonium salts will exhibit substantially the cooking and paste viscosity characteristics of untreated granular starch. Diazonium salts of esters of starch prepared from starch esters having higher degrees of substitution are increasingly more difficult to paste to yield dispersions having substantial viscosities. When these diazonium salts of esters of starch are in granular form, they have utility as dusting powders since they do not tend to hydrate in the presence of moisture. For purposes of this invention, the degree of substitution is the number of ester groups per anhydroglucose unit, the molecular weight of the anhydroglucose unit being 162.

The nitrous acid concentration of the reaction medium may vary depending upon the degree of substitution of the starch ester used and, of course, on the degree of diazotizing desired. When the starch ester is to be completely diazotized, it is preferred that about two moles of nitrous acid be used for every mole of starch ester present.

The diazonium salts of esters of starch of the present invention may be cross-linked. Generally the cross-linking reaction is carried out under acidic conditions.

Cross-linking of the diazonium salts of esters of starch is believed to proceed as follows:

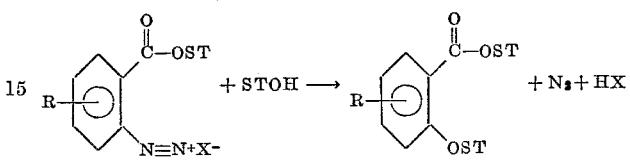

where R, ST, STOH and X are identified above.

The exact conditions under which the cross-linking reaction is performed is dependent, among other things, upon the ester content of the diazonium salts of the esters of starch and the particular properties desired in the diazonium salts. Generally, however, the cross-linking reaction is performed under acidic conditions and preferably at a pH of less than about 6, and most preferably at a pH from about 3.5 to about 6. The cross-linking may be performed when the diazonium salts of esters of starch are in granular form or in a film prepared from a paste or dispersion of the diazonium salts. The cross-linked diazonium salts of esters of starch in granular form have utility as dusting powders since they do not tend to hydrate in the presence of moisture. For this purpose, it is preferred that cross-linked diazonium salts of esters of starch be prepared from starch esters having a degree of substitution of above about 0.015. When cross-linking is performed in a film of the diazonium salts of esters of starch, the ester content thereof should be such, of course, that the diazonium salts have a degree of substitution below about 0.1 since at higher degrees of substitution, the salts will not substantially disperse in water.

The time and temperature necessary to achieve cross-linking in a film are interdependent. Cross-linking may occur at ambient temperature, but the time required would be extremely long, for instance months. Preferably, the cross-linking reaction is performed at a temperature of from about 200° to about 300° F. The time necessary to achieve cross-linking at these temperatures is in the range of from about 1 to about 5 minutes. At higher temperatures of about 700° F., a period of time of less than about 0.1 second is sufficient.

The diazonium salts of esters of starch have particular application in coating of papers. Pastes of the diazonium salts show exceptionally good adhesive properties, and when mixed with clay and applied to paper show excellent ability to bind the clay to the paper. After the paper is coated with such pastes and heated to effect cross-linking, greatly improved wet-rub resistance is achieved. Such coated paper may be obtained by pasting the starch ester, diazotizing the starch ester, adding clay to the paste, coating paper with the paste containing the clay and then heating the coated paper to achieve cross-linking. Also the coated paper may be obtained by pasting starch, forming the starch ester thereof and either diazotizing while the starch ester is in the form of a paste or diazotizing after the starch ester is applied to the paper. Cross-linking may be achieved by the method described above. Still another method for preparing such coated papers is forming a paste of starch, aplying the paste to the paper, forming the ester of starch, diazotizing and cross-linking as described above. When paper is coated by following the first method described above and the degree of substitution of the starch is varied from about 0.001 to about 0.03, there is a concomitant increase in the wet-rub resistance observed. At degrees of substitution of from 0.03 to about 0.1 no further improvement in the wet-rub resistance is observed.

The diazonium salts of esters of starch of the present invention may be coupled with coupling compounds. Examples of classes of coupling compounds which may be coupled to the diazonium salts are the arylamines, phenols, certain hydrocarbons, pyrroles and quinones. Illustrative of specific examples of coupling compounds are p-chlorophenol, p-nitrophenol, o-nitrophenol, o-dimethylphenol, p-sulfophenol, p-azoxyphenol, p-phenylazophenol, p-benzoquinone, 2-hydroxy-1,4-naphthoquinone, beta-naphthol and dimethyl aniline. When beta-naphthol and phenol were coupled with the diazonium salts, deep orange and pale yellow colors, respectively, were observed. When dimethyl aniline was couped with the diazonium salts a starch product was produced having acid-base indicator properties, being a red color at a pH of less than about 4.4 and being a yellow color at a pH of greater than about 6.2. The intensity of the colors of these coupled diazonium salts will generally depend upon the quantity of diazonium salt present which is in turn dependent, of course, on the ester content of the starch ester used and on the extent of the diazotization.

The conditions under which the coupling reaction is performed are not critical, but preferably when diazonium salts of esters of starch are coupled with a coupling compound from the amine class, the pH of the reaction mixture is from about 2 to about 6, and in the case of coupling compounds from the phenol class, the pH of the reaction mixture is from about 5 to about 8. Advantageously, the coupling reaction is carried out in an aqueous medium.

The ester content of the starch esters used to prepare the diazonium salts of esters of starch of the present invention was determined by analysis performed by the following method:

Five grams, on a dry solids basis, of the starch ester was washed with water and methanol to remove any unreacted anhydride. The starch ester was suspended with stirring in 25 ml. of water, filtered on a sintered glass filter, and the cake washed with three ml. portions of methanol. The cake was resuspended in 25 ml. of methanol, filtered and washed as described above, and suspended in 200 ml. of water. Phenolphthalein indicator was added to the suspension and 0.1 N sodium hydroxide solution added until a light pink color was observed. Exactly 25 ml. of a 0.1 N sodium hydroxide solution was added and the suspension placed in a boiling water bath with stirring for 10 minutes. The suspension was removed from the bath and the excess alkali immediately determined by back-titration with 0.1 N hydrochloric acid solution until the same light pink color indicated above was observed. The same procedure as above was followed using the parent starch which had not been treated to determine the amount of alkali used by the same. The difference between the two titers represents the amount of alkali required for saponification of the ester. The percent ester present was calculated by using the following formula:

Percent ester =
$$\frac{(\text{ml. of alkali} \times \text{normality of alkali}) \times \text{M.W. of substituent group}}{\text{grams of Sample} \times 1000} \times 100$$

where M.W. is the molecular weight of the substituent group. When isatoic anhydride is reacted with starch to obtain an anthranilic acid ester of starch, the molecular weight of the substituent group is 120.

In the following examples, the fluidity of starch was measured according to the method disclosed in Cereal Chemistry, 36, pp. 108–127 (March 1959), entitled "The Estimation of Starch Paste Fluidities" by W. R. Fetzer and L. C. Kirst.

In order to more clearly describe the nature of the present invention, specific examples will hereinafter be described. It should be understood, however, that this is done solely by way of example, and is intended neither to delineate the scope of the invention nor limit the ambit of the appended claims. In the examples and throughout this specification, percentages refer to percent by weight and are based on the dry substance weight of the starch present, unless otherwise specified.

EXAMPLE I

This example illustrates the preparation of a diazonium salt of the present invention from an ester of anthranilic acid and starch, and its use in a paper coating formulation. This example also illustrates that the diazonium salt of an ester of starch imparts improved wet-rub resistance to paper coatings.

Sufficient granular 354 fluidity acid-modified corn starch was suspended in water to provide 1 liter of slurry containing 460.5 g. dry basis starch (2.84 moles of anhydroglucose units), and 717.5 g. of water. This slurry had a density of 22.0° Bé (corrected to 60° F.). The slurry was transferred into a reaction vessel and placed in a constant temperature water bath adjusted to maintain a slurry temperature of 130° F. When the slurry reached this temperature, sufficient sodium hydroxide solution was added to adjust the slurry pH to 8.2 as determined at 130° F., and incremental addition was started of isatoic anhydride. The total amount of isatoic anhydride added was 2 percent (0.20 mole per anhydroglucose unit). After each addition of isatoic anhydride, the slurry pH was adjusted by the addition of sodium hydroxide solution to maintain a pH value in the range of 7.8 to 8.2. The alternate additions of isatoic anhydride and sodium hydroxide solution were continued until all the reagents had been added, which addition required 9 minutes. After 10 minutes from the start of the reaction, 0.0585 mole of sodium hydroxide had been added to neutralize the carbonic acid formed. The reaction slurry was stirred during the reaction, and for 36 minutes after the final addition of isatoic anhydride. The pH of the slurry during the 36-minute period was maintained in the range indicated above by occasional sodium hydroxide addition. A total of 0.0608 mole of sodium hydroxide was added during the entire reaction period to maintain the pH in the range indicated above. The slurry was then acidified to a pH of 5.5 by the addition of muriatic acid, and the starch ester was recovered by vacuum filtration on a Buchner funnel, resuspended in sufficient water to obtain 1000 ml. of slurry and vacuum filtered and washed. The starch ester was dried in a forced draft hot air laboratory model Proctor and Schwartz drier at an air temperature of 160° F.

The starch ester had an ester content equivalent to 0.0156 anthranilate ($-C(O)C_6H_4-NH_2$) groups per anhydroglucose unit, and a nitrogen content of about 0.13 percent which was nearly three times that of the starting acid-modified starch. The starch ester was in granular form. The ester content of the starch ester was determined by the saponification method described above.

A slurry was prepared containing 15 parts of the starch ester, 143 parts of water and 0.27 parts of sodium nitrite. The pH of the slurry was adjusted with hydrochloric acid to a value of 5. The slurry was heated to 200° to 205° F. for 2 minutes, the resulting paste cooled to about 80° F., and the pH thereof adjusted to 3.5 by the addition of hydrochloric acid. This paste was added slowly to a clay slip containing 100 parts of finely dispersed clay (Edgar H. T. predispersed clay), 70 parts of water and 0.25 part of tetrasodium pyrophosphate with agitation, and the mixture stirred for 15 minutes to effect an intimate mixture. The mixture was spread onto paper in a thin layer by the use of a Bird applicator having a gap of 0.0015 inch and the coating allowed to dry under ambient conditions. The coated paper was heated for 5 minutes in an oven maintained at an air temperature of 266° F. in order to effect cross-linking. The wet-rub resistance was measured according to a modification of Method RC-185 of the Technical Association of the Pulp and Paper Industry. The modified method was performed as follows:

Two drops of de-ionized water at room temperature were applied to a portion of the coated paper from a medicine dropper. The paper was contacted through the water with the tip of a finger. The coating was rubbed with moderate pressure over a 2 inch path at a rate of approximately 2 strokes per second. At the end of the tenth stroke, the fingertip was lifted away from the paper and the adherent material was applied to a piece of black glazed paper and smeared over a path of about 1½ inches. The smear was dried at an ambient temperature and an estimate was made of the amount of pigment present. When virtually no pigment was observed, the coating was considered to have excellent wet-rub resistance. When a dense white smear was observed, the coating was considered to have poor wet-rub resistance.

The wet-rub resistance of the coating composition of the present invention was considered excellent.

EXAMPLE II

This example illustrates the preparation of a cross-linked granular starch product of the present invention.

An anthranilic ester of starch in granular form was prepared according to the method disclosed in Example I. The anthranilic ester of starch was diazotized in the manner described in Example I, except that the temperature was 59° F.; the starch ester concentration was 460.5 parts; the sodium nitrite concentration was 7.74 parts; and the pH of the slurry was adjusted to a value of 4 with sulfuric acid. After stirring the slurry for 10 minutes at 50° F., the diazonium salt was recovered by filtering on a Buchner funnel and the cake washed twice with water to remove unreacted nitrous acid. The filter cake was resuspended in cold deionized water to a volume of 1 liter. The pH of the slurry was adjusted to 2 by the addition of sulfuric acid, heated to 137° F. with constant stirring and the temperature of the slurry allowed to drift down to 132° F. over a 15-minute period. The pH of the slurry was adjusted to a value of 5.5 by the addition of a sufficient quantity of a saturated solution of sodium carbonate. The product was recovered by filtration on a Buchner funnel, washed thoroughly and dried in a forced draft hot air laboratory model Proctor and Schwartz drier at an air temperature of 180° F. The starch product was highly cross-linked as evidenced by the fact that when it was heated in near-boiling water for a period of 90 minutes, no viscosity increase was observed. Also, at the end of the 90-minute heating period, the starch product quickly settled out leaving a clear supernatant and a solid phase. Microscopic examination of the solid phase showed that although the starch granules did not exhibit a birefringent cross, they were only slightly swollen. Nitrogen analysis of the cross-linked starch product showed a nitrogen count of 0.013 percent by weight as compared to a nitrogen content of 0.13 percent for the anthranilic acid ester of starch used as the starting material.

EXAMPLE III

This example illustrates coupling a diazonium salt of an ester of starch of the present invention with coupling compounds.

An anthranilic ester of starch in granular form was prepared according to the method disclosed in Example I. The anthranilic ester of starch was diazotized in the manner described in Example II, except that the pH was 3.5; the starch ester concentration was 50 parts; and the sodium nitrite concentration was 0.81 part. The diazonium salt was recovered in the manner described in Example II. The diazonium salt was resuspended in water and sufficient sodium carbonate added to the slurry to adjust its pH to a value of 7.5. 0.2 g. of beta-naphthol was added to the slurry and almost immediately a deep orange color was observed. The color was retained by the starch product even after the product was washed with water.

The same procedure as above was followed using as coupling compounds phenol and dimethyl aniline. In the case of phenol, a pale yellow color was observed. The use of dimethyl aniline yielded a starch product which had acid-base indicator properties. This product turned red at a pH below about 4.4 and yellow at a pH of about 6.2 or higher.

EXAMPLE IV

This example illustrates the preparation of a light-sensitive paper coating.

An anthranilic ester of starch was prepared according to Example I. A 6 percent suspension of this ester of starch was prepared and dispersed by heating and boiling for 1 minute. The dispersion was cooled to about 20° C. and diazotized according to Example II. This dispersion was spread onto paper by the use of a Bird applicator having a gap of 0.0015 inch. The coated paper was dried under ambient conditions. Portions of the coated paper were exposed to ultraviolet light for periods of 0, ½, 8, 21, 60, 90 and 120 minutes. The paper was then coated with a 2 percent resorcinol solution. The portions of paper exposed for 0 and ½ minutes developed a deep yellow color, whereas the portions of paper exposed for 8, 21, 60, 90 and 120 minutes developed increasingly lighter yellow colors.

EXAMPLE V

This example illustrates the preparation of diazonium salts of the present invention from esters of anthranilic acid and starch having varying degrees of substitution and the use of these diazonium salts to coat paper.

Granular 354 fluidity acid-modified starch was suspended in water to provide 6½-liter slurries, each containing 230 parts of dry basis starch (1.42 moles of anhydroglucose units) and 359 parts of water. The density of the slurries was 22.0° Bé (corrected to 60° F.). Sufficient caustic-salt solution (containing 6.6 g. of sodium hydroxide and 25.6 g. of sodium chloride per 100 ml. of solution) was added to provide 0.33 part of sodium hydroxide in each slurry. The slurries were transferred into reaction vessels and placed in a water bath adjusted to maintain the slurries at 130° F. Isatoic anhydride was added to the vessels to provide the following concentrations by weight; 0.5, 1.0, 2.0, 5.0, 10.0 and 0 percent, corresponding to 0.005, 0.01, 0.02, 0.05, 0.1 and 0 moles of isatoic anhydride per anhydroglucose unit. The vessels were covered to prevent undue evaporization of water, and the slurries were stirred for a period of 18 hours. The pH of each slurry was then adjusted to 5.5 by the addition of muratic acid. The products were recovered by filtering on a Buchner funnel. The cakes were washed on the funnel and resuspended in water to a volume of 500 ml. The slurries were sieved through a No. 200 mesh U.S. Standard sieve. The products were recovered as described above and were dried in the manner described in Example I at an air temperature of 160° F. Analysis of the starch esters by the saponification method described above showed 0.08, 0.18, 0.71, 2.12, 4.45 and 0 percent ester by weight, respectively, corresponding respectively to 0.5, 1.0, 2.0, 5.0, 10.0 and 0 percent isatoic anhydride. The degrees of substitution of the starch esters were 0.0011, 0.0024, 0.0097, 0.0290, 0.0629 and 0, respectively.

The starch esters were pasted, diazotized and incorporated into clay coatings as described in Example I. The coatings were applied to paper and dried under ambient conditions. Portions of the dried, coated papers were heated for 5 minutes in an oven maintained at an air temperature of 266° F. in order to effect cross-linking. The unheated and the heated portions of coated papers were evaluated for wet-rub resistance by the finger rub method described in Example I. The unheated coatings showed no wet-rub resistance. The heated coatings showed wet-rub resistance corresponding to the ester content as follows:

TABLE I

| Percent isatoic anhydride used | Degree of substitution | Wet-rub resistance rating |
|---|---|---|
| 0.5 | 0.0011 | Poor. |
| 1.0 | 0.0024 | Fair. |
| 2.0 | 0.0097 | Good. |
| 5.0 | 0.0290 | Excellent. |
| 10.0 | 0.0629 | Do. |

The results in the above table show that as the degree of substitution is varied up to about 0.03 there is a concomitant increase in wet-rub resistance observed, and that at degrees of substitution greater than about 0.03 no further increase in wet-rub resistance is observed.

EXAMPLE VI

This example illustrates the preparation of diazonium salts of the present invention from esters of anthranilic acid and starch which were prepared from hydroxyethyl starch and an oxidized starch, and their use in paper coating formulations. This example also illustrates that such diabonium salts of the present invention impart far greater wet-rub resistance to paper coatings than a diazonium salt of dextrin.

Slurries were prepared containing 15 parts dry basis granular hydroxyethyl starch having a degree of substitution of about 0.06 (and also a 760 fluidity oxidized starch and a white dextrin), 0.27 part of sodium nitrite, 0.3 part of isatoic anhydride and sufficient water to bring the total weight to 49 parts. The pH was found to be 6.1 (6.1 and 5.5 for the oxidized starch and the dextrin, respectively). The slurries were heated to a rolling boil and held there for one minute. They were then cooled to 80° F., and the weights of the slurries were restored with water to 49 parts. The pH of each paste was adjusted to 3.5 with hydrochloric acid. The pastes were added to 143.3 parts of clay suspension containing 100 parts of Edgar H.T. predispersed clay, 0.25 part of tetrasodium pyrophosphate and 43 parts of water. The mixtures were mixed at high speed for 10 minutes, 1.0 part of calcium stearate was added, and mixing continued for 5 minutes more. The pH's of the mixtures were observed to be in the range of 5.3 to 5.5. The coating mixtures were applied to paper by the use of a Bird applicator having a gap of 0.0005 inch and the coatings allowed to dry under ambient conditions. A portion of each coated paper was heated for 5 minutes in an oven having 266° F. air temperature in order to effect cross-linking. Estimation of the wet-rub resistance by the method described in Example I gave the following results:

TABLE II

| Starch | Wet-rub resistance rating | |
| | Not heated | Heated |
|---|---|---|
| Hydroxyethyl | None | Excellent. |
| Oxidized, 769 fluidity | do | Do. |
| White dextrin | do | Poor. |

EXAMPLE VII

This example illustrates the effect of pH of a coating formulation containing a diazonium salt of the present invention on the development of wet-rub resistance in clay coatings.

An ester of anthranilic acid and starch prepared according to the procedure described in Example I, was weighed out to provide 15 parts dry basis in 144 parts of water. The starch ester was cooked for 5 minutes at 205° to 208° F., and the paste restored with water to its original weight and cooled to 80° F. To the paste was added 0.27 part of sodium nitrite. After adjusting the pH to 3.5 with hydrochloric acid, the paste was added to 170.3 parts of clay suspension containing 100 parts of finely dispersed clay (Edgar H.T. predispersed clay), 0.25 part tetrasodium pyrophosphate and 70 parts of water. The mixture was stirred vigorously for 15 minutes to insure thorough mixing. The pH of the mixture was adjusted to 3.5 with hydrochloric acid and was coated onto paper by the use of a Bird applicator having a gap of 0.0005 inch. Similar paper coatings were prepared from coating mixtures adjusted to pH's of 4.0, 4.5, 5.0, 6.0, 7.0 and 9.0, by the use of a 2 percent sodium hydroxide solution. Portions of the coated sheets were dried at ambient conditions, and portions were dried for 5 minutes in an oven having an air temperature of 266° F. Estimation of wet-rub resistance by the method described in Example I gave the results shown in the following table:

TABLE III

| pH of the coating mixture | Wet-rub resistance rating | |
| | Not heated | Heated |
|---|---|---|
| 3.5 | Very poor | Excellent. |
| 4.0 | do | Do. |
| 4.5 | do | Do. |
| 5.0 | do | Do. |
| 6.0 | do | Do. |
| 7.0 | do | Do. |
| 9.0 | do | Poor. |

From the above table, it is apparent that a relatively broad range of pH's may be used to prepare a clay coating containing the diazonium salts of the present invention.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. Diazonium salts of esters of starch and anthranilic acid and diazonium salts of esters of starch and derivatives of anthranilic acid, having the following formula:

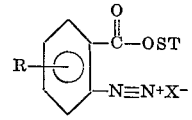

where ST is an anhydroglucose unit, where X is a salt forming ion and where R is selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino and
(D) a heterocyclic radical containing 2 to 6 carbon atoms and one or more atoms of oxygen, nitrogen and sulfur; wherein the diazonium salts have a degree of substitution up to about 3 ester groups per anhydroglucose unit.

2. Diazonium salts of esters of starch and anthranilic acid and diazonium salts of esters of starch and derivatives of anthranilic acid as defined in claim 1, wherein the diazonium salts are in granular form.

3. Diazonimum salts of esters of starch and anthranilic acid and diazonium salts of esters of starch and derivatives of anthranilic acid as defined in claim 2, wherein the diazonium salts have a degree of substitution of less than about 0.1 ester groups per anhydroglucose unit.

4. Diazonium salts of esters of starch and anthranilic acid as defined in claim 1.

5. A cross-linked starch product having the following formula:

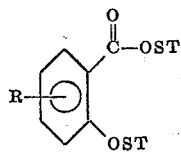

where ST is an anhydroglucose unit and where R is selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxy, hydroxyl, carboalkoxy, alkoxy, polyalkoxy, guanido, imino, primary and secondary amino, and
(D) a heterocyclic radical containing 2 to 6 carbon atoms and one or more atoms of oxygen, nitrogen and sulfur.

6. A coated paper composition which has improved wet-rub resistance comprising paper and a cross-linked starch product as defined in claim 5.

7. A coated paper composition which has improved wet-rub resistance as defined in claim 6 wherein the diazonium salts of esters of starch and anthranilic acid have a degree of substitution of from about 0.001 to about 0.03 ester groups per anhydroglucose unit.

8. A method of preparing diazonium salts of esters of starch and anthranilic acid and diazonium salts of esters of starch and derivatives of anthranilic acid comprising diazotizing esters of starch and anthranilic acid and esters of starch and derivatives of anthranilic acid having the following formula:

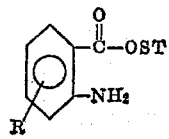

where R is a radical selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary imino, and
(D) a heterocyclic radical containing 2 to 6 carbon atoms and one or more atoms of oxygen, nitrogen, and sulfur; wherein the diazotization is carried out at an acidic pH in the presence of nitrous acid.

9. A method of preparing diazonium salts of esters of starch and anthranilic acid and diazonium salts of esters of starch and derivatives of anthranilic acid as defined in claim 8, wherein the pH is from about 3 to about 5.

10. A method of preparing diazonium salts of esters of starch and anthranilic acid and diazonium salts of esters of starch and derivatives of anthranilic acids as defined in claim 9, wherein diazotization is carried out in an aqueous medium and there is present nitrous acid.

11. A method of preparing diazonium salts of esters of starch and anthranilic acid and diazonium salts of esters of starch and derivatives of anthranilic acid as defined in claim 10, wherein conditions are maintained to produce diazonium salts of esters of starch and anthranilic acid and diazonium salts of esters of starch and derivatives of anthranilic acid in granular form.

12. A method of preparing a cross-linked starch product wherein diazonium salts of esters of starch and anthranilic acid and diazonium salts of esters of starch and derivatives of anthranilic acid are heated for a time and at a temperature to effect cross-linking, the diazonium salts being characterized by the following formula:

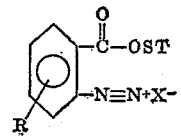

where ST is anhydroglucose unit, where X is a salt forming ion and where R is selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing 2 to 6 carbon atoms and one or more atoms of oxygen, nitrogen, and sulfur.

13. A method of preparing a closs-linked starch product as defined in claim 12, wherein cross-linking is performed at a pH of less than about 6.

14. A method of preparing coupled diazonium salts of esters of starch and anthranilic acid and diazonium salts of esters of starch and derivatives of anthranilic acid having the following formula:

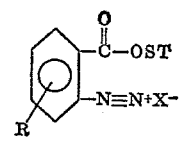

where ST is an anhydroglucose unit, where X is a salt forming ion and where R is selected from the group consisting of:
(A) a hydrocarbon radical selected from the group consisting of alkyl, alkenyl, alkynyl, cycloalkyl, cycloalkenyl, aryl, (B) a radical selected from the group consisting of hydrogen, alkoxy, aryloxy, amino, acyl, aldehydo, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido, (C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxy, hydroxyl, carbalkoxy, alkoxy, polyalkoxy, guanido, imino, primary and secondary amino, and (D) a heterocyclic radical containing 2 to 6 carbon atoms and one or more atoms of oxygen, nitrogen and sulfur, comprising reacting the diazonium salts with coupling compounds.

15. Diazonium salts of esters of starch and anthranilic acid and diazonium salts of esters of starch and derivatives of anthranilic acid as defined in claim 1, wherein the diazonium salts are in aqueous paste form.

16. Diazonium salts of esters of starch and anthranilic acid and diazonium salts of esters of starch and derivatives of anthranilic acid as defined in claim 1, wherein the diazonium salts are in film form.

17. A cross-linked starch product as defined in claim 5, wherein the starch product is in granular form.

18. A cross-linked starch product as defined in claim 5, wherein the starch product is in film form.

References Cited

UNITED STATES PATENTS

| | | | |
|---|---|---|---|
| 2,150,968 | 3/1939 | Guenther et al. | 260—214 |
| 2,926,063 | 2/1960 | Reeves et al. | 8—116.2 |
| 3,393,969 | 7/1968 | Wade et al. | 8—116.2 |

OTHER REFERENCES

Pancirolli, Chemical Abstracts, vol. 31, 7247.

DONALD E. CZAJA, Primary Examiner

M. I. MARQUIS, Assistant Examiner

U.S. Cl. X.R.

106—210, 214; 260—233.3